Oct. 9, 1956  A. M. GEORGIEV ET AL  2,766,408
VENT PLUG FOR ELECTROLYTIC CAPACIATOR
Filed Dec. 6, 1954
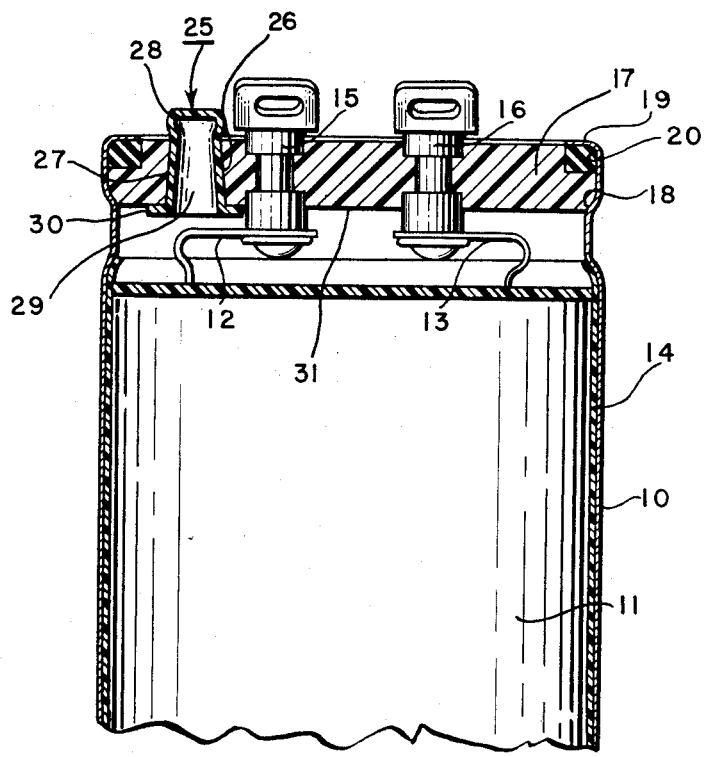
Fig. 1
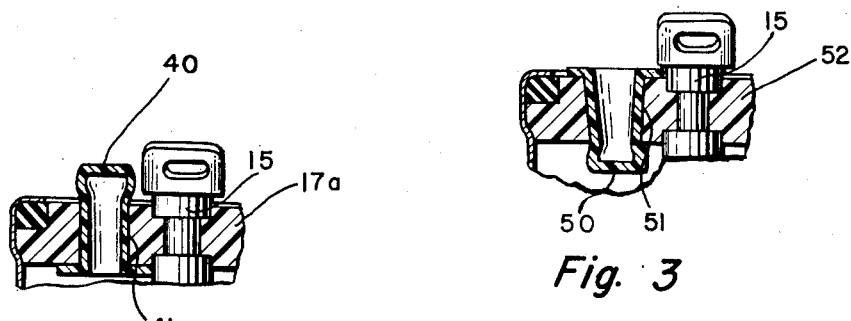
Fig. 2
Fig. 3
INVENTORS
Alexander M. Georgiev
James L. Hancock
BY
Craig V. Morton
Their Attorney

United States Patent Office 2,766,408
Patented Oct. 9, 1956

2,766,408

VENT PLUG FOR ELECTROLYTIC CAPACITOR

Alexander M. Georgiev, Clearfield, Pa., and James L. Hancock, Fairborn, Ohio, assignors to General Motors Corporation, Detroit, Mich., a corporation of Delaware Application December 6, 1954, Serial No. 473,118

6 Claims. (Cl. 317—230)

This invention relates to electrolytic condensers or capacitors, and more particularly to a vent construction or safety device provided in the wall of the capacitor to relieve excess gas developed within the capacitor unit during its operation.

It is well known that during the operation of electrolytic capacitors that substantial quantities of gas may be developed within the capacitor unit due to various causes such as high alternating current of an AC operating voltage or accidental polarity reversals in the so-called polarized capacitors due to a rapid reforming of the dielectric or blocking film after prolonged periods of idleness, heavy overload conditions and many other reasons well known to those skilled in the art.

It has therefore become a general practice to protect capacitor units against explosion resulting from high pressure gas within the capacitor, the gas being retained within the capacitor as a result of complete sealing of the capacitor against infiltration of moisture and other agents having a destructive effect on the capacitor. The capacitor units are usually hermetically sealed.

Safety or venting devices have therefore been used on capacitors to provide for escape of high pressure gas from the capacitor unit when the pressure of the gas rises to a dangerously high value.

The high pressure gas developed within a capacitor is also accomplished by a substantial rise in temperature of the capacitor above normal operating temperature, the temperature and the gas pressure rising concurrently.

It is therefore an object of this invention to provide an improved vent or safety device that is, particularly suitable for electrolytic capacitors, to be responsive only to concurrently existing heat and pressure conditions before providing for venting of the capacitor.

It is another object of the invention to provide a vent or safety plug in a wall of a capacitor that is formed of a thermoplastic material that is semi-rigid at all normal operating temperatures of the capacitor to effect thereby a pressure sealing engagement in an opening provided in the wall of the capacitor, the thermoplastic material being heat softenable increasingly upon a progressive rise in temperature of the capacitor with concurrent pressure rise internally of the capacitor so that at a predetermined temperature the heat softenable plug will be of sufficient softness and resilience to permit the internal pressure in the capacitor existing at that temperature to force the heat softened and now resilient plug from the opening of the wall of the capacitor for escape of the gas from the capacitor.

It is another object of the invention to provide an improved vent or safety device for an electrolytic capacitor or condenser wherein either pressure or temperature conditions alone will not effect an injection of the safety vent plug from an opening in the wall of a capacitor, but at normal operating temperatures the vent plug or safety device will remain semi-rigid to prevent accidental displacement of the vent plug even though internal pressure in the capacitor may rise temporarily above normal operating conditions, and so long as the internal pressure in the capacitor remains at a normal low level, some rise in temperature of the capacitor will not effect a failure of the vent.

It is another object of the invention to provide a vent plug or safety device for an electrolytic capacitor in accordance with the foregoing objects wherein the plug is made of a semi-rigid heat softenable thermoplastic material that is preferably sufficiently heat softenable at about 200° F. to provide for ejection of a plug from an opening in the wall of a capacitor when pressure rises to a value in the neighborhood of 100 p. s. i. Such heat softenable thermoplastic materials are available commercially on the market, for example, polyethylene, polystyrene, nylon, polyvinyl chloride, cellulose acetate, butyrate, and methyl methacrylate.

Further objects and advantages of the present invention will be apparent from the following description, reference being had to the accompanying drawings wherein a preferred form of the invention is clearly shown.

In the drawings:

Figure 1 is a cross sectional view of an electrolytic capacitor or condenser incorporating the subject of this invention.

Figure 2 is a partial cross sectional view illustrating a modified form of the vent plug of the invention.

Figure 3 is a further modified form of the vent plug of the invention.

In this invention the capacitor or condenser comprises a metal can 10 in which there is placed a conventional electrolytic condenser or capacitor 11 which may consist of two electrode strips of aluminum or other film forming metal separated by strips of a dielectric paper, the superposed electrode and spacer strips being wound into a capacitor or condenser unit with tabs 12 and 13 extending from separate electrodes. An insulating shell 14 of dielectric material is placed between the metal can and the capacitor roll 11.

The terminal tabs 12 and 13 are suitably connected to the terminal pins 15 and 16 that are mounted in the cover 17. The cover 17 comprises a rigid body that engages the shoulder 18 of the can 10, the outer end 19 of the can 10 being formed over a resilient washer 20 to hermetically seal the can 10.

To provide for venting of gases evolved within the container 10 during some abnormal operation of the capacitor, a vent plug or safety device 25 is provided in the cover 17 of the capacitor.

The cover 17 is provided with a tapered opening 26 that receives the vent plug 25.

The vent plug 25 is in the form of a cone and conforms generally to the taper of the wall of the opening 26. The plug 25 thus comprises a hollow cone shaped member having a thin wall 27 that engages the wall of the opening 26. The outer end 28 of the plug is closed while the hollow interior 29 of the plug 25 is open to the gases created within the container 10.

The plug 25 is provided with an outwardly extending flanged portion 30 on the end of the plug that is positioned within the container. The flange portion 30 is adapted to engage the inner face 31 of the cover 17.

The vent plug 25 is made of a thermoplastic material that is semi-rigid at all normal ambient or room temperatures and somewhat elevated thereabove, but which material is heat softenable as the temperature becomes progressively higher, the softening of the thermoplastic material causing it to become resilient and flowable through the opening 26 when high pressure also exists internally of the container 10.

There is available on the commercial market any number of thermoplastic materials that are particularly suited to use as vent plug materials, the primary factor being that they shall be sufficiently heat softenable in a range from 180–200° F. that they are sufficiently soft to allow the plug 25 to be blown outwardly from the opening 26 when a pressure of from 80–100 p. s. i. exists within the container 10. Suitable thermoplastics that are available are: polyethylene, polystyrene, nylon, polyvinyl chloride, cellulose acetate butyrate, methyl methacrylate. These thermoplastic materials are normally semi-rigid under temperature conditions that might be termed normal ambient or room temperature, that is below about 130°, or thereabouts. As temperatures increase substantially above what might be termed normal ambient temperature conditions the material still remains in a semi-rigid condition but in the range of about 175–200° F. there is a definite softening of the material from the semi-rigid condition. The materials are not yet what might be termed flowable from the standpoint of compression or injection molding of the materials, yet they have lost a substantial portion of their rigidity and have in effect become soft and resilient.

When the thermoplastic safety vent plug 25 is in the softened condition just referred to, high pressure within the container 10 can force the plug 25 outwardly from the opening 26 and thereby vent the high pressure gases from within the container 10.

It is an anomaly that high pressure conditions within the capacitor container 10 coexist only with high temperature conditions of the capacitor. Thus heat softening of the vent plug 25 occurs at the same time that high pressure conditions exist within the capacitor container.

The heat softening point of the vent plug 25 can thus be selected against the maximum pressure rise desired in the capacitor container to provide for sufficient softening and resilience of the vent plug 25 at the selected maximum temperature desired in the container to effect a blow out of the vent plug from the opening 26 when the predetermined temperature and coexisting pressure conditions are established in the capacitor.

Also, the point at which the blow out can occur under selected pressure conditions can be varied by a change in the angle of the cone shape of the opening 26 and the vent plug 25, a gradual increasing of the diameter of the base of the cone relative to the apex generally requiring higher pressure and high temperature conditions to exist in the capacitor before the thermoplastic vent plug 25 will be softened sufficiently to provide for a blow out of the plug at the coexisting pressure and temperature conditions.

Also, the cone shape of the opening 26 and the vent plug 25, as illustrated in Figure 1, provides for a pressure sealing of the vent plug 25 in the opening 26 as the vent plug gradually softens until such time as the pressure rises to the predetermined value and effects a complete ejection of the vent plug from the opening 26. The thermoplastic vent plug thus provides an accurately controlled point of coexisting temperature pressure values at which the vent plug will be ejected from the opening 26. If either the temperature or the pressure is of lower value than that required for the ejection under the pre-established coexistent pressure temperature condition, the vent plug will not be ejected from the opening 26. If either of these pressure or temperature conditions of lower value should independently exist in the capacitor there is the major probability that no serious damage is occurring to the capacitor and therefore there is no particular reason for causing the vent plug to effect a venting of the capacitor. Such conditions might exist for example in the effect of an abnormally high room ambient temperature without coexisting high pressure in the capacitor. Under this condition there is no gas evolution in the capacitor that represents a danger of destruction of the capacitor and even though the vent plug 25 may be materially softened by the abnormally high room temperature, there is no reason for venting of the capacitor because pressure conditions are not sufficiently high as to effect destruction of the capacitor. Obviously a quick short circuit in the capacitor that might be self healing could also occur to provide a temporary high pressure condition without resultant heat of the capacitor. Here again it would not be desirable for the capacitor to vent.

In Figure 2 there is illustrated a slightly modified form of safety vent 40 that is made of thermoplastic material as heretofore described. In this modification the vent plug 40 is made in a true cylinder shape and would be ejected more readily from the opening 41 in the cover 17a than the form of the vent plug 25 illustrated in Figure 1.

In Figure 3 there is illustrated still another form of thermoplastic vent plug 50 in which the cone shape of the vent plug and the opening 51 in the cover 52 is just reverse of that illustrated in Figure 1. In the arrangement shown in Figure 3 the vent plug would be ejected more readily from the opening 51 than that illustrated in either Figure 1 or 2.

Hence it can be seen that modification of the longitudinal contour of the vent plug can be made to provide a variable factor at which coexisting effective temperature and pressure conditions will eject the vent plug from the capacitor to vent the capacitor.

While the form of embodiment of the invention as herein disclosed constitutes a preferred form, it is to be understood that other forms might be adopted as may come within the scope of the claims which follow.

What is claimed is as follows.

1. In an electrolytic condenser, the combination of a gas impervious container adapted to enclose a condenser unit having an electrolyte, a wall of said container having an opening therein, and a thin walled resiliently semi-rigid heat softenable hollow plug having one closed end and a generally radially outwardly extending peripheral flange at the opposite end, said plug being disposed in said opening sealing the same and projecting from each of opposite ends of said opening with said closed end forming a bulbous protrusion at one end of said opening and said flange engaging said container wall at the opposite end of said opening, said plug being constituted to maintain a resilient semi-rigid condition under all normal operating temperatures in resilient pressure sealing engagement with the wall forming the opening to retain the container sealed and softenable progressively increasingly with progressive rise in temperature only above normal operating temperatures to effect an increase in resilience of said plug with consequent physical deformation of the plug on rise in pressure in the container to effect bodily ejection of the plug from the opening at predetermined concurrently effective pressure and temperature conditions above normal pressure and temperature conditions.

2. A combination in an electrolytic condenser structure in accordance with claim 1 in which the said plug has a wall thickness in that portion of the plug engaging the wall forming the opening that is peripherally uniform.

3. A combination in an electrolytic condenser structure in accordance with claim 1 in which the said plug has a wall thickness in that portion of the plug engaging the wall forming the opening that is peripherally uniform and in which the end of the plug within the container has the outwardly extending peripheral flange to engage the face of the wall in the container in which the opening is formed.

4. A combination in an electrolytic condenser structure in accordance with claim 1 in which the said opening has the wall thereof tapered and said plug is correspondingly tapered to fit in said opening.

5. A combination in an electrolytic condenser structure in accordance with claim 1 in which the said opening has a cone shape and said plug has a cone shape to fit within said opening.

6. A combination in an electrolytic condenser structure in accordance with claim 1 in which the said opening is cone shaped and said plug is cone shaped to fit within said opening with the plug wall being of uniform thickness in that portion thereof engaging the wall forming the opening with the end of the plug within the container having the outwardly extending flange to engage the face of the wall within the container in which the opening is formed.

References Cited in the file of this patent

UNITED STATES PATENTS

| | | |
|---|---|---|
| 2,203,902 | Georgiev | June 11, 1940 |
| 2,290,996 | Robinson | July 28, 1942 |
| 2,500,632 | Drake | Mar. 14, 1950 |
| 2,535,945 | Menschik | Dec. 26, 1950 |